DRAPERY ROD FIXTURE
Original Filed March 25, 1960 2 Sheets-Sheet 1
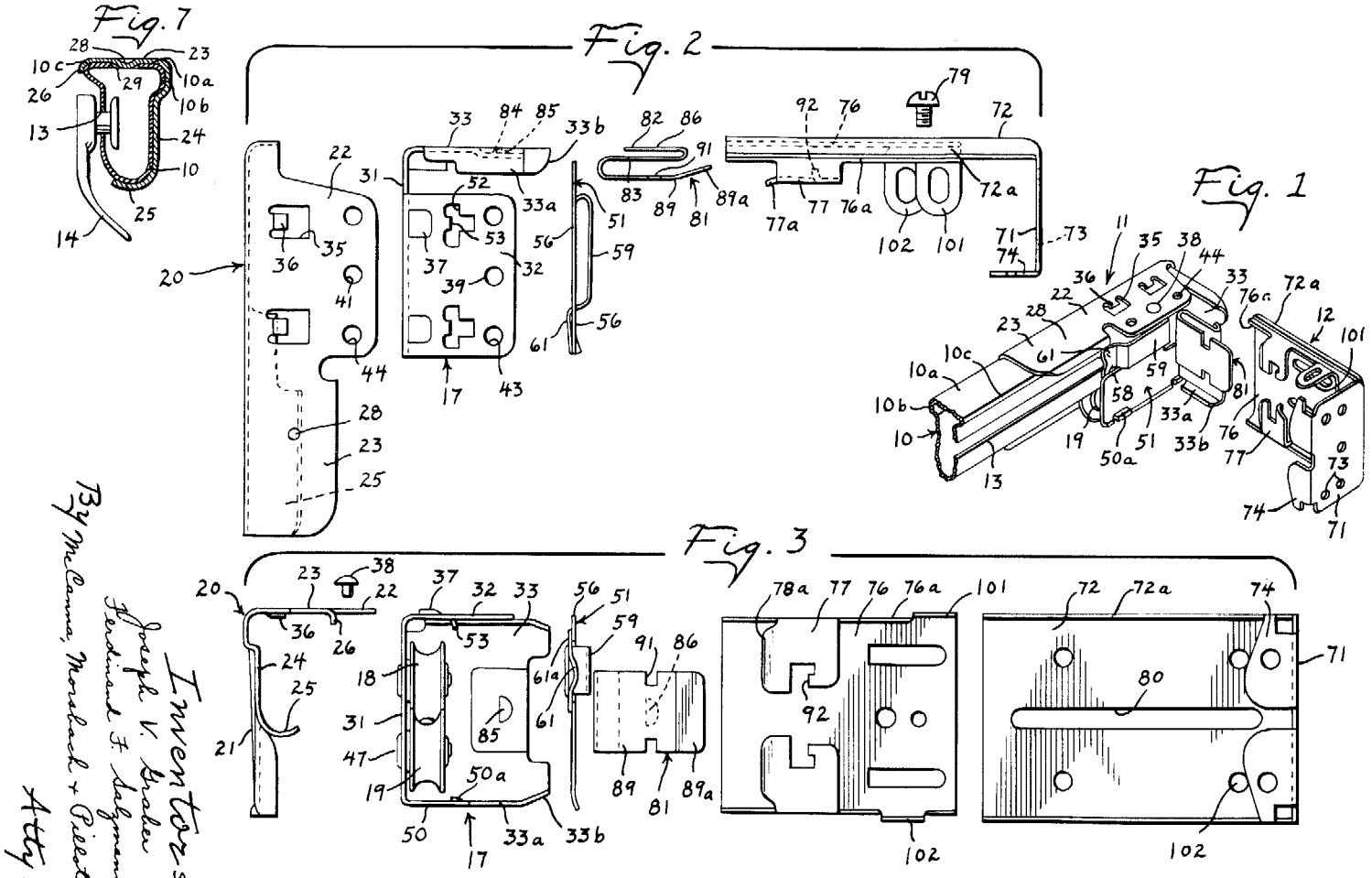
Inventors
Joseph V. Graber
Ferdinand F. Salzmann
By McCanna, Morsbach + Pillote
Atty's June 18, 1963 J. V. GRABER ET AL Re. 25,399
DRAPERY ROD FIXTURE
Original Filed March 25, 1960 2 Sheets-Sheet 2
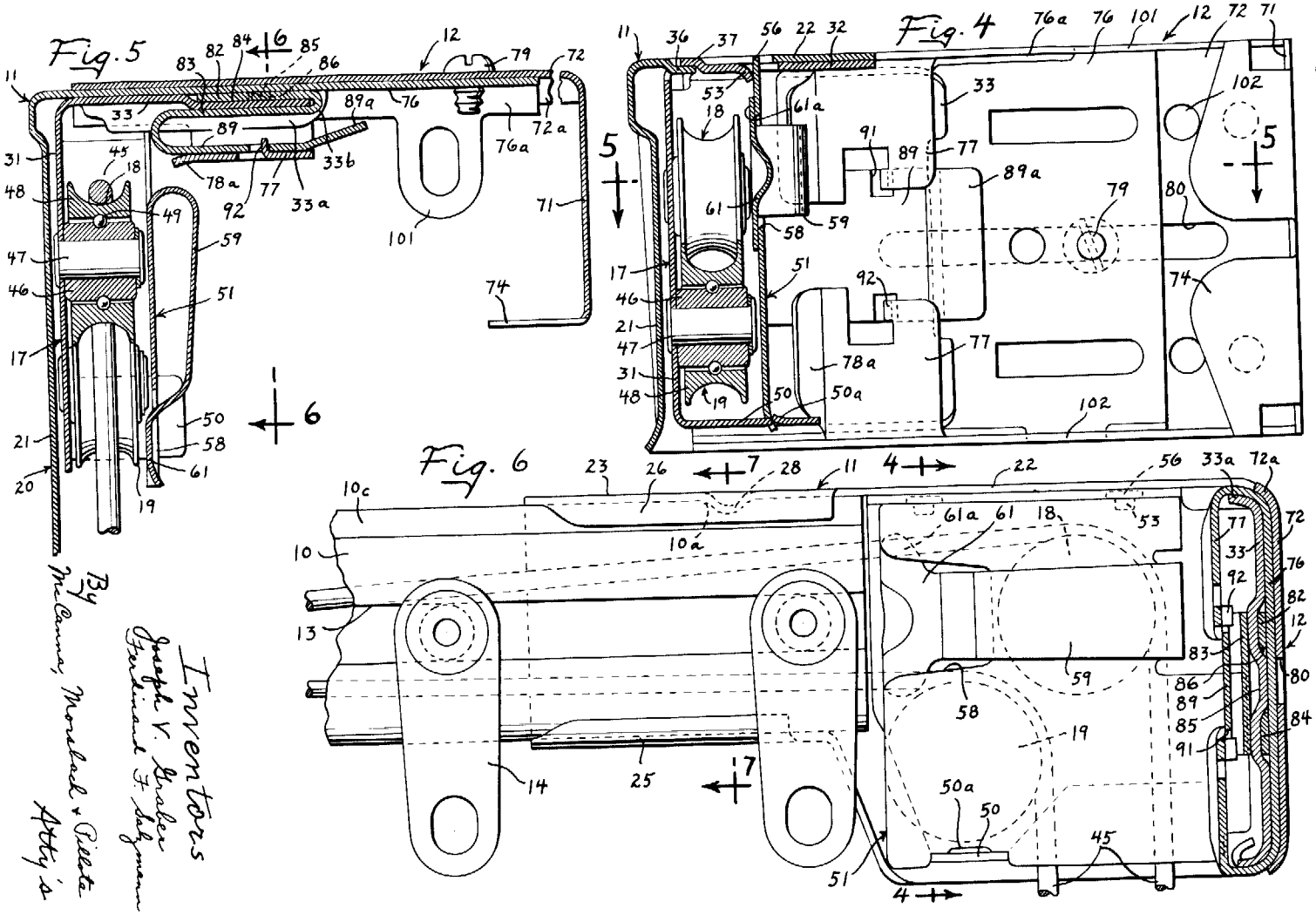
Inventors
Joseph V. Graber
Ferdinand F. Salzmann
By McCanna, Morsbach & Pillote
Atty's United States Patent Office Re. 25,399

Reissued June 18, 1963

25,399

DRAPERY ROD FIXTURE

Joseph V. Graber and Ferdinand F. Salzmann, Madison, Wis., assignors to Graber Manufacturing Company, Inc., Middleton, Wis., a corporation of Wisconsin Original No. 3,049,176, dated Aug. 14, 1962, Ser. No. 17,517, Mar. 25, 1960. Application for reissue Dec. 12, 1962, Ser. No. 244,229

17 Claims. (Cl. 160—346)

Matter enclosed in heavy brackets [ ] appears in the original patent but forms no part of this reissue specification; matter printed in italics indicates the additions made by reissue.

This invention relates to drapery fixtures and particularly to improvements in the brackets for mounting the drapery rod and pulleys on a supporting surface.

An important object of this invention is to provide a drapery fixture of the type employing a rod bracket which engages the rod and an end bracket for mounting the rod bracket on a supporting surface, which fixture has an improved arrangement for detachably interconnecting the rod bracket and end bracket to facilitate assembly and removal of the rod bracket from the end bracket when the latter is attached to the supporting surface.

Another object of this invention is to provide a drapery fixture in accordance with the foregoing object in which the fixture can be mounted close to a ceiling or other overhead obstruction and wherein the rod bracket is movable horizontally into and out of assembled relation of the end bracket with a straight line motion to enable detachment and assembly of the rod bracket from the end bracket even when there is substantially no overhead clearance.

Another object of this invention is to provide a drapery fixture having an improved arrangement for mounting the pulleys wherein the rear end of the pulley housing is open to facilitate threading of the traverse cords over the pulleys and a detachable cover is provided for retaining the cords on the pulleys during use of the fixture.

A further object of this invention is to provide a drapery fixture in which the drapery slides can move to a point closely adjacent the ends of the fixture to reduce the dead space at the ends of the fixture when the slides are fully retracted.

Yet another object of this invention is to provide a drapery fixture in which the rod bracket has an improved slide gate construction for facilitating insertion and removal of the slides from the drapery rod, and which slide gate is so arranged as to not interfere with the assembly of the drapery rod on the rod bracket.

Still another object of this invention is to provide a drapery fixture having an improved arrangement for locking the drapery rod on the rod bracket, which arrangement facilitates assembly of the rod and prevents distortion of the rod and the rod trackway when the rod is assembled on the bracket.

These, together with various ancillary objects and advantages of this invention will be more readily appreciated as the same becomes better understood by reference to the following detailed description when taken in connection with the accompanying drawings wherein:

FIGURE 1 is a fragmentary perspective view of the drapery fixture illustrating the manner in which the rod bracket is assembled on the end bracket;

FIG. 2 is a partially exploded top plan view of the rod bracket and end brackets;

FIG. 3 is an exploded side view of the rod bracket and end brackets;

FIG. 4 is a vertical sectional view through the assembled rod bracket and end bracket showing the parts on an enlarged scale and taken on the plane 4—4 of FIG. 6;

FIG. 5 is a horizontal sectional view through the rod bracket and end bracket and taken on the plane 5—5 of FIG. 4;

FIG. 6 is a vertical sectional view taken on the plane 6—6 of FIG. 5, and

FIG. 7 is a sectional view taken on the plane 7—7 of FIG. 6.

The drapery fixture in general includes a traverse rod 10, a rod bracket such as 11 at each end of the rod for supporting the rod and traverse cord pulleys, and end brackets 12 for mounting the rod brackets on a supporting surface. The rod 10 is hollow and has a longitudinally extending slot 13 formed therein to define a trackway for slidably supporting the drapery slides. As is conventional, the drapery slides include a master slide (not shown) which is connected to the draw cord for moving the leading edge of a drapery, and a plurality of auxiliary slides designated by the numeral 14 for supporting the upper edge of the drapery at spaced points therealong. The specific rod herein shown has a flat top 10a to enable mounting of the rod closely adjacent the ceiling, and has front and rear beads 10b and 10c respectively adjacent the juncture of the top with the front and rear walls of the rod.

The rod bracket 11 includes a pulley case 17 for supporting the pulleys 18 and 19, and a housing 20 for supporting the traverse rod 10 adjacent one end of the pulley case. As shown herein, the housing 20 is formed separate from the pulley case and is attached thereto. The housing has a front panel 21 overlying the front of the pulley case and a top panel 22 overlying the top of the pulley case. A generally C-shaped rod support section is formed at one end of the housing and includes a top wall 23, which merges with the top panel 22, and a front wall 24 which merges with the front panel 21. The support section also includes a bottom wall 25 which underlies the rod, and a depending flange 26 on the top wall 23 for retaining the rod in position. As is best shown in FIGS. 1, 6 and 7, the rod support section defines a socket which slidably receives the end of the rod 10 to support the same adjacent one end of the pulley case.

The ends of the traverse rod 10, particularly in the adjustable type employing two telescoping sections, must be held against axial withdrawal from the socket formed on the housing 20. Heretofore, the sockets for receiving the traverse rods have been dimensioned to provide a very snug fit so as to frictionally retain the end of the rod against axial movement. However, the C-shaped traverse rods are generally formed of a relatively light gauge metal stock which distorts when the rod is radially compressed. This materially reduces the effectiveness of the frictional grip to retain the rod against axial movement, and also distorts the rod and reduces the width of the trackway 13 therein. In order to overcome these difficulties, a nib or detent 28 and a depression or hole 29 are formed in the top wall 23 and top 10a of the rod support section and the traverse rod, respectively. As the rod is inserted into the socket, the rod engages the detent 28 which radially compresses the rod. This has the advantage of reducing the frictional resistance to insertion of the rod into the socket. When the depression or opening 29 registers with the detent, the rod springs back to its initial position and substantially relieves all distortion of the trackway 13 in the rod. The detent 28 extends into the opening 29 and releasably locks the rod against withdrawal from the socket.

The pulley case 17 includes a front plate 31, a horizontally disposed top plate 32 extending rearwardly from the upper edge of the front plate, and an end plate 33 which extends rearwardly from one end of the front plate. As previously described, the pulley case is connected to the housing and for this purpose the top panel of the housing has spaced openings 35 formed therein. A rearwardly extending ear 36 projects into each opening and is offset below the top panel 22 a distance substantially equal to the thickness of the panel. The top plate 32 of the pulley case has spaced sockets 37 upset to a level above the top plate and located so as to receive the depressed ears 36 when the case and housing are assembled as shown in FIG. 4. A rivet 38 extends through aligned openings 39 and 41 in the top plate and top panel 32 and 22 respectively to firmly retain the housing and case in assembled relation. Additional sets of aligned openings 43 and 44 are formed in the top plate and top panel to receive screws for fastening the rod bracket directly to a ceiling, if desired.

In accordance with the present invention, the pulleys 18 and 19 are mounted solely on the front plate 31 of the pulley casing, and the pulley casing is open at the rear side thereof so that the draw cords 45 may be easily threaded over the pulleys. The specific pulleys shown herein each include a hub 46 which is secured to the front plate as by a rivet 47, and an outer rim 48 which is supported on the hub by bearings 49. As will be noted, the hub has a somewhat greater axial length than the rim so that the rim is spaced axially a short distance from the end wall and rotates freely. A cover plate 51 is removably attached to the pulley case and overlies the rear ends of the pulleys to retain the traverse cords thereon.

The cover plate is mounted between the top plate 32 of the pulley case and a latch finger 50 which extends rearwardly adjacent the lower edge of the pulley case. For this purpose, the top plate 32 has spaced openings therein spaced rearwardly from the sockets 37 and defining stop faces 52 at the rear sides of the opening and a depending tab 53 at the front side of the opening. The cover plate 51 has upwardly extending ears 56 which are adapted to extend into the openings between the tabs 53 and the rear stop faces 52 to locate the upper end of the cover plate. The cover plate, when assembled on the pulley case, closely overlies the rear ends of the pulleys, and is retained thereagainst by a catch 50a formed on the latch finger 50.

After the drapery rods are installed, it is frequently necessary to add or remove some auxiliary slides 14 to provide the proper number for the particular drapery on the fixture. As best shown in FIG. 6, the cover plate 51 is formed with a notch 58 in one edge thereof having a height sufficient to permit the heads on the inner ends of the auxiliary slides 14 to be inserted and removed therethrough. The cover plate 51 is formed of a resilient material and the slide gate 59 is formed integrally with the cover plate adjacent the edge thereof opposite the traverse rod 10. The slide gate is bent into overlying relation with the rear face of the cover plate 51, as best shown in FIGS. 2 and 5, and has an offset portion 61 at its free end which extends through the notch 58. Lateral ears 61a are formed on the offset portion and underlie the front side of the cover plate to limit outward movement of the slide gate. As will be noted, the end of the slide gate is spaced outwardly of the end of the rod 10 so as to enable the auxiliary slides 14 to move completely to the end of the rod. This reduces the "dead space" at the end of the traverse rod and also facilitates assembly of the rod onto the brackets since the slide gate does not interfere with insertion or removal of the rod. As will be noted, the slide gate is normally positioned to close the notch 58 and prevent movement of the auxiliary slides out of the opening or notch 58. However, when the slide gate is pressed toward the front plate 31, it uncovers the notch 58 and permits auxiliary slides to be added or removed from the track 13.

The end bracket 12 for mounting the rod bracket 11 on a supporting surface is preferably made adjustable.

The end bracket includes an L-shaped mounting member having a base 71 adapted for attachment to an upright surface such as a wall, and an arm 72 extending forwardly from the base. The base has a plurality of openings 73 formed therein for receiving the usual attaching screws (not shown) and may have curtain rod support ears 74 formed on the edge opposite the arm 72. The end bracket 12 also includes a socket member having a panel 76 which underlies the inner side of the arm 72 and opposed legs 77 which extend toward each other from the top and bottom edges of the panel and in lateral spaced relation thereto. The socket member is adjustable along the arm 72 and arranged to be locked in adjusted position by a screw 79 which extends through an elongated slot 80 in the arm and is threaded into the panel 76. Preferably the upper and lower edges of the arm 72 and panel 76 are rolled inwardly as indicated at 72a and 76a respectively to provide a shallow channel configuration for guiding the socket member on the mounting member during telescopic adjustment thereof and to also rigidify the members. The opposed legs 77 extending toward each other from the top and bottom edges thereof define a socket for slidably receiving the end plate 33 of the pulley case. Advantageously, the end plate 33 is also formed with inwardly rolled edges 33a at its top and bottom and the rear end of the rolled edges are beveled as indicated at 33b to facilitate guiding of the end plate 33 into the socket between panel 76 and legs 77.

A spring clip 81 is provided for detachably locking the rod bracket to the end bracket. As best shown in FIGS. 2 and 3, the spring clip has a generally S-shaped configuration and includes first and second interconnected sections 82 and 83 which are adapted to overlie the outer and inner faces of the end plate 33. The latter is formed with a depression 84 therein for receiving the outer section 82 of the spring clip so that the spring clip lies flush with the outer face of the leg. An outwardly projecting catch 85 is formed on the end plate 33 and a depression or hole 86 is formed in the section 82 of the spring clip to lock the spring clip onto the end plate. As will be noted from FIG. 5, the panel 76 of the socket member closely overlies the outer face of the end plate 33 and the section 82 of the spring clip so as to prevent detachment of the clip from the catch 85 when the parts are assembled.

The second section 83 of the spring clip extends forwardly and engages the rear side of the cover plate 51, as shown in FIGS. 4 and 5, to aid in preventing outward movement of the cover plate. A third section 89 of the spring clip extends forwardly in spaced relation to the end plate 33 and has a cam portion 89a at its outer end which is inclined toward the plate. Notches 91 are formed in the top and bottom edges of the section 89 of the clip. When the plate 33 is inserted in the socket between the legs 77 and the panel 76, the third section 89 of the spring clip is cammed inwardly by the legs. The forward edges 78a of the legs are inclined away from the panel 76 as shown in FIGS. 2 and 5 to aid in guiding the spring clip into the socket. Lateral ears 92 are formed on the legs 77 and are arranged to extend into the notches 91 in the spring clip to lock the parts in assembled relation. It will thus be noted that the rod bracket and rod can be assembled onto the end bracket by moving the rod bracket horizontally until the end plate 33 slides into the socket and the spring clip latches the same in position. To remove the end bracket, it is only necessary to depress the outer section 89 of the spring clip and retract the rod bracket. Since the rod bracket can be assembled with a straight horizontal motion, it is apparent that the fixture can be mounted close to a ceiling or similar obstruction where there is substantially no overhead clearance.

Apertured ears 101 and 102 are conveniently provided at the top and bottom edges of the socket member 72, and which ears are adapted to receive screws to aid in fastening the fixture to a ceiling, if desired. Openings 102 are provided in the arm 72 adjacent the rear end thereof for receiving drapery hooks or, when the end bracket is located in a corner, for receiving attaching screws (not shown).

The assembly and operation of the drapery fixture has been generally indicated in connection with the foregoing description of the structure. More particularly, in assembling the fixture, the pulleys are attached to the front plate 31 of the pulley case by rivets 47 and the pulley case is then asembled on the housing 20 with the ears 36 on the housing extending into the sockets 37 on the case. The rivet 38 holds the case in assembled relation on the housing. Since the ears 36 extend into the sockets 37, the ears do not project below the underside of top plate 32 of the case and cause fraying of the traverse cords.

The traverse rod 10 is thereafter inserted into the rod socket on the pulley housing. When the top 10a of the rod engages the detent 28, the top of the rod is pressed inwardly away from the top wall 23 of the socket and materially reduces the frictional resistance to insertion of the rod. When the rod abuts against the end of the pulley case, the detent 28 registers with the opening 29 in the rod so that the rod returns to its normal shape. In this regard, the socket on the housing is formed with the inside dimensions substantially the same as the outside dimensions of the rod so as to minimize distortion of the trackway in the rod.

The drapery cords 45 are then threaded over the pulleys 18 and 19. Since the rear side of the pulley case is open, threading of the cords over the pulleys is greatly facilitated. The cover 51 is thereafter assembled on the pulley case with the ears 56 disposed between the tabs 53 and stop faces 52 on the top plate 32 of the pulley case. The lower edge of the cover plate engages the catch 50a on the latch finger 50. The spring clip 81 is thereafter assembled on the end plate 33 of the pulley case and is locked in position by catch 86. The forward end of the section of the spring clip abuts against the cover plate to aid in preventing movement of the plate away from the pulleys. The cover plate retains the cords on the pulleys and supports the slide gate 59. The slide gate is positioned so that it can be easily operated when the rod is installed. The finger can be depressed by one finger when the operator is standing in front of the rod for withdrawing or inserting the slides 14. As will be noted, the slide gate does not extend into the rod 10 so that it does not interfere with insertion or removal of the rod and, moreover, enables the slides to move all the way to the end of the rod to reduce the dead space at the ends of the fixture when the slides are fully retracted.

The end brackets 12 are mounted on the supporting wall or surface prior to assembly of the rod brackets thereon. The end brackets can be attached to a wall or window frame moulding by screws inserted through openings 73 in the base 71, or to an end wall by screws inserted through the drapery hook openings 102 in the arm 72. Alternatively, the end brackets can be attached to an overhead structure such as a ceiling by screws inserted through the upper one of the ears 101 or 102. In this regard it is to be noted that the ears 101 and 102 are staggered as shown in FIG. 2 to provide clearance for the screw driver inserted from below the fixture.

The rod bracket 11 is assembled on the end bracket 12 with a horizontal straight line motion so that the fixture can be installed directly on the ceiling. The end plate 33 on the pulley case slides into the socket formed by the panel 76 and opposed legs 77 which extend toward each other from the upper and lower edges of the panel. The outer section 89 of the spring clip 81 moves into the socket and, when the end of the panel 76 abuts against the edge of the housing 20, the spring clip latches against the ears 92 on the legs 77 to releasably hold the rod bracket in assembled relation on the end bracket. The section 89 of the spring clip is easily accessible when the rod bracket is assembled on the end bracket and, when depressed, releases the rod bracket to permit withdrawal of the rod bracket. As will be noted, the panel 76 closely overlies the section 82 of the spring clip and prevents detachment of the spring clip from the latch 86 when the rod bracket is assembled on the end bracket.

We claim:

1. A rod bracket for supporting a drapery traverse rod, said rod bracket including a pulley case and means fixed to said pulley case for supporting a traverse rod adjacent one end of the pulley case, said case including a front plate, at least one cord pulley, said pulley case also including means rotatably mounting said pulley solely on said front plate with the pulley extending rearwardly therefrom, said pulley case being open at the rear side thereof to facilitate threading of a traverse cord over the pulley, and a cover plate removably attached to said pulley case to extend generally parallel to said front plate and overlying the rear end of the pulley to retain the traverse cord on the pulley.

2. A rod bracket for supporting a drapery traverse rod, said rod bracket including a pulley case adjacent one end and means for supporting a traverse rod adjacent the other end, said pulley case having a front plate and being open at the rear side thereof, at least one cord pulley, means rotatably mounting said pulley solely on said front plate for rotation about an axis perpendicular thereto and with the pulley extending rearwardly of the front plate, said pulley case having a generally horizontal top plate extending rearwardly from the upper edge of said front plate and a latch finger extending rearwardly from the lower edge of the front plate, and a cover plate detachably mounted on said top plate and said latch finger to extend generally parallel to said front plate and overlie the rear end of the pulley whereby to retain the traverse cord on the pulley.

3. A rod bracket for supporting a drapery traverse rod, said rod bracket including a pulley case adjacent one end and means for supporting a traverse rod adjacent the other end, said pulley case having a front plate and being open at the rear side thereof, at least one cord pulley, means rotatably mounting said pulley solely on said front plate for rotation about an axis perpendicular thereto and with the pulley extending rearwardly of the front plate, said pulley case having a generally horizontal top plate extending rearwardly from the upper edge of said front plate and a latch finger extending rearwardly from the lower edge of the front plate, said top plate having spaced notches therein disposed along a line paralleling said front plate, a cover plate overlying the rear end of the pulley and having ears on the upper edge thereof extending into said notches, and means on said latch finger engaging said cover plate adjacent its lower edge for releasably retaining said cover plate in position on the pulley case.

4. A drapery fixture comprising a hollow rod having a continuous longitudinal slot in the rear face thereof, a rod bracket including a pulley case adjacent one end, a rod support section adjacent its other end, said case including a front pulley mounting plate, at least one pulley, means rotatably mounting the pulley on said front plate to extend rearwardly therefrom in cantilever fashion, the rear end of the pulley case being open to facilitate threading of a traverse cord over the pulley, a cover plate removably attached to said pulley case to extend generally parallel to said front plate and overlying the rear end of the pulley to retain the cord on the pulley, and a resilient finger formed integrally with said cover plate and having a free end extending to a point adjacent said slot in said rod to form a slide stop, said free end of the finger being movable laterally of said cover plate to uncover the end of the slot in the rod and enable a slide to be inserted or removed from the slot in the rod.

5. A drapery fixture comprising a hollow rod having a continuous longitudinal slot in the rear face thereof, a rod bracket including a pulley case adjacent one end, a rod support section adjacent its other end, said case including a front pulley mounting plate, at least one pulley means rotatably mounting the pulley on said front plate to extend rearwardly therefrom in cantilever fashion, the rear end of the pulley case being open to facilitate threading of a traverse cord over the pulley, a cover plate removably attached to said pulley case to extend generally parallel to said front plate and overlying the rear end of the pulley to retain the cord on the pulley, and a slide gate finger formed integrally with said cover plate adjacent the edge of the cover plate remote from the rod, said finger extending alongside the rear face of said cover plate in spaced relation thereto toward said rod and having a free end disposed adjacent the end of the slot in the rod to form a slide stop, said free end of the slide gate being movable laterally of said cover plate into and out of position closing the end of the slot.

6. A drapery fixture comprising a hollow rod having a continuous longitudinal slot in the rear face thereof, a rod bracket including a pulley case adjacent one end, a rod support section adjacent its other end, said case including a front pulley mounting plate, at least one pulley, means rotatably mounting the pulley on said front plate to extend rearwardly therefrom in cantilever fashion, the rear end of the pulley case being open to facilitate threading of a traverse cord over the pulley, a cover plate removably attached to said pulley case to extend generally parallel to said front plate and overlying the rear end of the pulley to retain the cord on the pulley, said cover plate having a notch therein registering with the end of the slot in the rod and having a width greater than the width of the slot, a slide gate finger on said cover plate overlying the rear face of the cover plate in spaced relation thereto, said finger having an offset portion at the free end thereof extending through said notch in the cover plate and underlying the front face of the cover plate adjacent said notch, said free end of said finger extending substantially contiguous to the end of said rod to enable slides to be moved up to the end of the rod, said free end of said finger being movable laterally of said plate to uncover the end of said slot and enable insertion and removal of slides from the rod.

7. A rod bracket for supporting a drapery traverse rod, said rod bracket including a pulley case adjacent one end thereof and means for supporting a drapery rod adjacent the other end, said pulley case having a front plate and an end plate on one end of the front plate and extending rearwardly thereof, an end bracket overlying the outer face of said end plate and having opposed legs attached to its top and bottom edges and extending toward each other in spaced relation to the inner face of the end bracket to form a socket for slidably receiving the end plate, a spring clip attached to said end plate and having a latch portion extending in spaced relation to the inner face of said end plate, said latch portion having at least one notch therein, and a finger on one of said legs extending into said notch to releasably latch the rod bracket onto the end bracket.

8. A rod bracket for supporting a drapery traverse rod, said rod bracket including a pulley case adjacent one end thereof and means for supporting a drapery rod adjacent the other end, said pulley case having a front plate and end plate on one end of the front plate and extending rearwardly thereof, an end bracket overlying the outer face of said end plate and having opposed legs attached to its top and bottom edges and extending toward each other in spaced relation to the inner face of the end bracket to form a socket for slidably receiving the end plate, a spring clip having a generally S-shaped configuration and including first and second interconnected sections overlying the outer and inner faces respectively of said end plate to support the clip thereon, said clip including a third section connected to said second section and extending rearwardly in spaced relation to the inner face of the end plate, said third portion having a notch therein, and a finger on one of said legs extending into said notch to releasably retain said rod bracket on said end bracket.

9. The combination of claim 8 wherein said first section of said clip and the abutting outer face of said end plate having an interfitting detent and depression formed in the abutting faces thereof for locking the clip on the end plate, said end bracket closely overlying said first section of the clip when the rod bracket is assembled on the end bracket to prevent disengagement of the clip from the end plate.

10. A rod bracket for supporting a drapery rod, said rod bracket including a pulley case adjacent one end and means for supporting a traverse rod adjacent its other end, said pulley case having a front plate and a top plate extending rearwardly from the upper edge of said front plate, a latch finger extending rearwardly from said front plate adjacent its lower edge, at least one pulley, means rotatably mounting said pulley solely on said front plate at the rear side of the latter, said case being open at the rear side of the pulley to facilitate threading of a traverse cord over the pulley, a cover plate overlying the rear end of the pulley to retain the cord thereon, means on said top plate and latch finger for releasably retaining said cover in position, said pulley housing including a generally vertically disposed end plate extending rearwardly from one end thereof, an end bracket defining a socket slidably receiving said end plate, and means releasably latching said end plate to said end bracket.

11. A rod bracket for supporting a drapery rod, said rod bracket including a pulley case adjacent one end and means for supporting a traverse rod adjacent its other end, said pulley case having a front plate and a top plate extending rearwardly from the upper edge of said front plate, a latch finger extending rearwardly from said front plate adjacent its lower edge, at least one pulley, means rotatably mounting said pulley solely on said front plate at the rear side of the latter, said case being open at the rear side of the pulley to facilitate threading of a traverse cord over the pulley, a cover plate overlying the rear end of the pulley to retain the cord thereon, means on said top plate and latch finger for releasably retaining said cover in position, said pulley case including a vertically disposed end plate extending rearwardly therefrom adjacent the end of the pulley case remote from the traverse rod, a spring clip having a generally S-shaped configuration and including first and second connected sections overlying the outer and inner faces respectively of said end plate to support the clip thereon, said second section extending forwardly and abutting against the rear face of said cover plate to aid in retaining the cover plate on the pulley case, said clip including a third section attached to the forward end of the second section and extending rearwardly therefrom in spaced relation to the end plate, an end bracket overlying the outer face of said end plate and having opposed legs attached to the top and bottom edges thereof and extending toward each other in spaced relation to the end bracket to form a socket for slidably receiving the end plate and said third section of the clip, and means on said legs engageable with said third section of said clip for releasably latching the pulley bracket on the end bracket.

12. A drapery rod fixture comprising, a hollow drapery rod having a continuous longitudinal slot therein defining a guideway for drapery slides, a rod bracket having a pulley case adjacent one end and a rod supporting section defining a socket adjacent the other end for receiving the end of the drapery rod, said pulley case including a front plate, an end plate extending rearwardly from the one end of the front plate, a top plate extending rearwardly from the upper edge of the front plate, and a latch finger extending rearwardly from the front plate adjacent its lower end, a pair of pulleys, means mounting said pulleys solely on said front plate to extend rearwardly therefrom, the rear side of said case being open to facilitate threading of a traverse cord around the pulleys, a cover plate removably attached to said top plate and said latch finger and overlying the rear ends of said pulleys to retain the cord thereon, said cover plate having a notch in one edge thereof registering with the slot in the rod to enable drapery slides to be inserted and removed therethrough, a resilient stop finger on said cover plate and extending alongside the rear face thereof, said stop finger having an offset portion extending through the notch in the cover plate and lateral portions on said free end engaging the front face of the cover plate to limit outward movement of the stop finger, a clip mounted on said end plate and engaging said cover plate to prevent outward movement of the cover plate, and an end bracket defining a socket for slidably receiving said end plate, said end bracket having means thereon engaging said clip for releasably locking said rod bracket on said end bracket.

13. A drapery rod fixture comprising, a hollow rod having a continuous longitudinal slot in the rear face thereof, a rod bracket including a pulley case adjacent one end and a rod support section at the other end defining a socket for slidably receiving the rod, at least one pulley rotatably mounted on said case, a plate overlying the rear ends of said pulley and disposed substantially contiguous with the rear face of said rod, said plate having a notch in one edge registering with said slot and dimensioned to enable slides to be inserted and removed therethrough, and a resilient stop finger on said plate extending in spaced relation to the rear face of the plate, said resilient stop finger being flexible in a direction laterally of said plate and having the free end thereof extending forwardly through said notch and terminating outwardly of the end of the rod, said free end of the stop finger having lateral portions underlying the front face of said plate to limit outward movement of the finger.

14. A drapery fixture comprising a hollow rod having a slot in the rear face thereof, a traverse cord extending longitudinally through the rod, a rod bracket on at least one end of said rod, said rod bracket including a pulley case and means fixed to the pulley case for supporting said traverse rod adjacent one end of the pulley case, said pulley case including an upright front plate and having an end opening at said one end of the case for receiving said traverse cord from said rod and a bottom opening at the underside of the case for passage of the traverse cord downwardly from the fixture, a pair of cord pulleys, said pulley case also including means rotatably mounting said pulleys solely on said front plate with the pulleys extending rearwardly therefrom, said pulley case having an open area at the rear side thereof extending from said end opening over the tops of the pulleys and down to said bottom opening, said traverse cord extending from the rod through said end opening over said pulleys and down through said bottom opening and being laterally insertable and removable from the pulley case through said open area at the rear side of the pulley case, and a case cover plate removably attached to said rod bracket to extend generally parallel to said front plate and overlying the rear ends of said pulleys to retain said traverse cord thereon.

*15. A rod bracket for supporting a drapery traverse rod, said rod bracket including a pulley case adjacent one end thereof and means supporting a drapery rod adjacent the other end, said pulley case having a front plate and an end plate on one end of the front plate and extending rearwardly thereof, an end bracket overlying the outer face of said end plate and having opposed retainer elements attached to its top and bottom edges and extending toward each other in spaced relation to the inner face of the end bracket to form a socket for slidably receiving the end plate, a latch leaf on said rod bracket extending in spaced relation to the inner face of said end plate, said latch leaf having at least one notch therein, and a finger on one of said retainer elements extending into said notch to releasably latch the rod bracket onto the end bracket.*

*16. A drapery fitting for supporting a drapery traverse rod comprising, a rod bracket including a front plate; means mounting a traverse cord pulley at the rear side of the front plate; means adjacent one end of the front plate for supporting a drapery rod; and a vertically disposed end plate adjacent the other end of the front plate extending rearwardly therefrom, an end bracket overlying the outer face of said end plate, said end bracket having lateral guide portions at its top and bottom edges guidably engaging the top and bottom edges of the end plate on the rod bracket and at least one retainer element spaced laterally from the inner face of the end bracket to form a socket for slidably receiving the end plate, a resilient latch leaf on said rod bracket extending in spaced relation to the inner face of said end plate and underlying said retainer element on the end bracket, said leaf and said retainer element having interengaging latch and keeper means thereon releasably retaining the rod bracket on the end bracket, said leaf being resiliently biased laterally away from the end plate toward said retainer element on the end bracket and being deformable in a direction toward said end plate to release the latch and keeper means.*

*17. A drapery fitting for supporting a drapery traverse rod comprising, a rod bracket including a front plate; means mounting a traverse cord pulley at the rear side of the front plate; means adjacent one end of the front plate for supporting a drapery rod; and a vertically disposed end plate adjacent the other end of the front plate extending rearwardly therefrom, an end bracket overlying the outer face of said end plate, said end bracket having lateral guide portions at its top and bottom edges guidably engaging the top and bottom edges of the end plate on the rod bracket and opposed retainer elements on said lateral portions extending toward each other in spaced relation to the inner face of the end bracket to form a socket for slidably receiving the end plate, a resilient latch leaf on said rod bracket extending in spaced relation to the inner face of the end plate and underlying the retainer elements on the end bracket, said leaf and said retainer elements having interengaging latch and keeper means thereon releasably retaining the rod bracket on the end bracket, said leaf being resiliently biased laterally away from the end plate toward said retainer elements on the end bracket and being deformable in a direction toward the end plate to release the latch and keeper means.*

References Cited in the file of this patent or the original patent

UNITED STATES PATENTS

| | | |
|---|---|---|
| 1,453,502 | Hinderliter | May 1, 1923 |
| 2,486,224 | Stutz | Oct. 25, 1949 |
| 2,498,067 | Chatfield | Feb. 21, 1950 |
| 2,682,385 | Schluter | June 29, 1954 |
| 2,889,573 | Bell et al. | June 9, 1959 |
| 2,913,212 | Bell | Nov. 17, 1959 |
| 3,011,748 | Brever | Dec. 5, 1961 |